US012358750B2

(12) United States Patent
Osborne, Jr.

(10) Patent No.: US 12,358,750 B2
(45) Date of Patent: Jul. 15, 2025

(54) CUTTING SYSTEM FOR A DISPENSER

(71) Applicant: Charles Agnew Osborne, Jr., Cumming, GA (US)

(72) Inventor: Charles Agnew Osborne, Jr., Cumming, GA (US)

( * ) Notice: Subject to any disclaimer, the term of this patent is extended or adjusted under 35 U.S.C. 154(b) by 106 days.

(21) Appl. No.: 15/848,643

(22) Filed: Dec. 20, 2017

(65) Prior Publication Data

US 2018/0170703 A1 Jun. 21, 2018

Related U.S. Application Data

(60) Provisional application No. 62/436,710, filed on Dec. 20, 2016.

(51) Int. Cl.

| | |
|---|---|
| ***B65H 35/10*** | (2006.01) |
| ***A47K 10/36*** | (2006.01) |
| ***A47K 10/38*** | (2006.01) |
| ***B26D 1/00*** | (2006.01) |
| ***B26D 1/16*** | (2006.01) |
| ***B26D 5/16*** | (2006.01) |
| ***B26F 1/18*** | (2006.01) |
| ***B65H 20/02*** | (2006.01) |

(52) U.S. Cl.

CPC ......... *B65H 35/10* (2013.01); *A47K 10/3612* (2013.01); *A47K 10/3618* (2013.01); *A47K 10/3625* (2013.01); *A47K 10/3643* (2013.01); *B26D 1/16* (2013.01); *B26D 5/16* (2013.01); *B26F 1/18* (2013.01); *B65H 20/02* (2013.01); *A47K 2010/365* (2013.01); *A47K 2010/3668* (2013.01); *A47K 2010/3881* (2013.01); *B26D 2001/0033* (2013.01); *B26D 2001/006* (2013.01); *B65H 2301/5152* (2013.01); *B65H 2301/515323* (2013.01); *B65H 2301/5154* (2013.01); *B65H 2403/512* (2013.01); *B65H 2701/1924* (2013.01)

(58) Field of Classification Search

CPC ................ B65H 35/10; A47K 10/3606; A47K 10/3631; A47K 10/3637; A47K 10/3643; A47K 10/365

USPC .................................................... 83/648–650

See application file for complete search history.

(56) References Cited

U.S. PATENT DOCUMENTS

| | | | | |
|---|---|---|---|---|
| 2,738,934 A | | 3/1956 | Dobkin | |
| 3,317,150 A | | 5/1967 | Summersby | |
| 3,554,456 A | | 1/1971 | Moore | |
| 3,892,368 A | | 7/1975 | Ricards | |
| 3,893,636 A | | 7/1975 | Wise et al. | |
| 4,003,525 A | | 1/1977 | Podvin et al. | |
| 4,071,200 A | | 1/1978 | Stone | |
| 4,188,844 A | * | 2/1980 | DeLuca | A47K 10/3643 83/337 |
| 4,192,442 A | | 3/1980 | Bastian et al. | |

(Continued)

FOREIGN PATENT DOCUMENTS

| | | |
|---|---|---|
| CN | 104703521 A | 6/2015 |
| EP | 0378550 B1 | 9/1994 |
| WO | WO2018/126236 A1 | 7/2018 |

*Primary Examiner* — Evan H Macfarlane

(74) *Attorney, Agent, or Firm* — Womble Bond Dickinson (US) LLP

(57) ABSTRACT

A dispenser for sheet material may include a feed roller with an integrated cutting mechanism that is movable with the feed roller for at least partially cutting or perforating the sheet material during dispensing thereof.

14 Claims, 15 Drawing Sheets

(56) References Cited

U.S. PATENT DOCUMENTS 4,635,837 A * 1/1987 Granger ............ A47K 10/3643 225/96
4,690,344 A 9/1987 Yokota
4,712,461 A * 12/1987 Rasmussen ........ A47K 10/3643 83/334
4,738,176 A 4/1988 Cassia
4,790,490 A 12/1988 Chakravorty
4,846,035 A 7/1989 Granger
5,048,386 A * 9/1991 DeLuca et al. .... A47K 10/3643 225/106
5,060,877 A 10/1991 Bullivant
5,441,210 A 8/1995 Hinton
5,452,832 A 9/1995 Niada
5,672,206 A 9/1997 Gorman
5,772,291 A 6/1998 Bryd et al.
5,848,609 A 12/1998 Marchesseault et al.
6,079,305 A 6/2000 Bloch et al.
6,098,917 A 8/2000 Cruz
6,179,243 B1 1/2001 Granger
6,196,102 B1 3/2001 Granger
6,199,792 B1 3/2001 Mivelaz
6,283,139 B1 9/2001 Symonds et al.
6,314,850 B1 11/2001 Morand
6,378,725 B1 4/2002 Granger
6,408,727 B1 6/2002 Harris et al.
6,411,920 B1 6/2002 McConnell et al.
6,532,979 B1 3/2003 Richter
6,553,879 B2 4/2003 Morand
6,691,945 B2 2/2004 Slezak
6,695,246 B1 2/2004 Elliott et al.
6,715,730 B2 4/2004 Ehr
6,820,785 B2 11/2004 Kapiloff
6,826,985 B2 12/2004 Broehl
6,834,825 B2 12/2004 Pollastrelli et al.
6,892,620 B2 5/2005 Kapiloff
6,892,746 B2 5/2005 Ford
6,895,848 B1 5/2005 Svensson
6,903,654 B2 6/2005 Hansen et al.
6,977,588 B2 12/2005 Schotz et al.
6,988,689 B2 1/2006 Thomas et al.
7,147,204 B2 12/2006 Hollingsworth et al.
7,213,782 B2 5/2007 Osborne et al.
7,296,765 B2 11/2007 Rodrian
7,357,348 B2 4/2008 Kananen
7,370,824 B1 5/2008 Osborne
7,373,864 B2 * 5/2008 Granger ............ A47K 10/3643 225/72
7,460,013 B1 12/2008 Osborne et al.
7,527,215 B1 5/2009 Siddiqui
7,571,670 B2 * 8/2009 Formon ............ A47K 10/3643 225/96
7,637,452 B2 12/2009 Kanbar et al.
7,946,522 B2 5/2011 Lewis et al.
7,987,756 B2 8/2011 Lewis et al.
8,082,827 B2 12/2011 Friesen et al.
8,146,471 B2 4/2012 Hansen et al.
8,167,228 B2 5/2012 Kobayashi et al.
8,297,160 B2 10/2012 Friesen et al.
8,353,475 B2 1/2013 Kobayashi et al.
8,382,026 B2 2/2013 Keily et al.
8,402,872 B2 3/2013 Friesen et al.
8,424,431 B1 4/2013 Jackman et al.
8,528,851 B2 9/2013 Friesen et al.
8,555,761 B2 10/2013 Keily et al.
8,578,826 B2 11/2013 Hansen et al.
8,651,003 B1 2/2014 Vercellone
8,733,218 B2 5/2014 Hansen et al.
8,800,415 B2 8/2014 Osborne
8,919,233 B2 12/2014 Lewis et al.
8,943,938 B2 2/2015 Sahlberg
9,010,602 B2 4/2015 Budz et al.
9,032,850 B2 5/2015 Chiba et al.
9,701,508 B2 7/2017 Diamond
9,756,992 B2 9/2017 Osborne
9,878,869 B2 * 1/2018 Morand ............ B65H 35/0086
9,907,441 B2 3/2018 Osborne et al.
10,441,117 B2 10/2019 Osborne, Jr.
2001/0045149 A1 11/2001 Granger
2002/0073819 A1 6/2002 Phelps et al.
2003/0019899 A1 1/2003 Chen et al.
2004/0188486 A1 9/2004 Granger
2005/0051008 A1 3/2005 Granger
2005/0145745 A1 7/2005 Lewis et al.
2005/0167541 A1 8/2005 Osborne
2006/0037449 A1 2/2006 Lavallee
2006/0236832 A1 10/2006 Cvjetkovic et al.
2007/0079684 A1 4/2007 Friesen et al.
2007/0176041 A1 8/2007 Friesen et al.
2007/0194166 A1 8/2007 Reinsel et al.
2007/0215743 A1 9/2007 Granger
2008/0128448 A1 6/2008 Cittadino et al.
2008/0217350 A1 9/2008 Hansen et al.
2009/0057478 A1 3/2009 Connor
2009/0140001 A1 6/2009 Lewis et al.
2009/0256022 A1 10/2009 Maurer
2010/0102101 A1 4/2010 Keily et al.
2010/0243696 A1 9/2010 Friesen et al.
2010/0286817 A1 11/2010 Goeking et al.
2010/0319508 A1 12/2010 Hagleitner
2011/0068129 A1 3/2011 Maurer
2011/0133019 A1 6/2011 Keily et al.
2011/0233318 A1 9/2011 Anderson
2012/0085857 A1 4/2012 Vienneau et al.
2012/0167739 A1 7/2012 Lewis et al.
2012/0182366 A1 7/2012 Kobayashi et al.
2012/0312853 A1 12/2012 Osborne et al.
2013/0192437 A1 8/2013 Sahlberg
2013/0320130 A1 12/2013 Osborne
2014/0054410 A1 2/2014 Achton
2014/0263812 A1 9/2014 Osborne
2014/0312158 A1 10/2014 Hluschenko et al.
2015/0083846 A1 3/2015 Budz et al.
2015/0297043 A1 10/2015 Osborne et al.
2016/0353945 A1 12/2016 Osborne
2016/0353946 A1 12/2016 Osborne
2016/0353947 A1 12/2016 Osborne
2017/0188760 A1 7/2017 Henson et al.
2017/0367547 A1 12/2017 Osborne
2017/0369262 A1 12/2017 Green
2018/0153360 A1 6/2018 Osborne, Jr. et al.
2018/0170703 A1 6/2018 Osborne, Jr.
2018/0263433 A1 9/2018 Osborne, Jr.
2020/0029751 A1 1/2020 Osborne, Jr.

* cited by examiner

CUTTING SYSTEM FOR A DISPENSER

CROSS-REFERENCE TO RELATED APPLICATIONS

The present patent application claims the benefit of U.S. Provisional Patent Application No. 62/436,710 filed Dec. 20, 2016.

INCORPORATION BY REFERENCE

The disclosure of U.S. Provisional Patent Application No. 62/436,710 filed Dec. 20, 2016, is hereby incorporated by reference as if presented herein in its entirety.

TECHNICAL FIELD

Embodiments of this disclosure generally relate to dispensers for flexible sheet materials such as tissue or paper products and, more particularly, cutting systems for such dispensers.

BACKGROUND

Different types of devices for dispensing selected quantities of paper and other flexible sheet products, such as for use in restrooms, hospitals and/or other environments, have been developed in recent years. Some of these dispensers have incorporated mechanical cutting mechanisms that cut or perforate a portion of the paper as it is dispensed, without requiring a user to pull and tear the paper against a tearing mechanism. A drawback with some of these mechanical cutting mechanisms is that their blades or other devices can cause bunching, ripping, or inconsistent cutting of the paper while it is being dispensed, particularly when different grades of paper (i.e., heavier towel type or thinner, tissue type paper). Additionally, such dispensers and cutting systems may produce a significant amount of noise during operation, which noise may be undesirable or disruptive in hospitals, offices, or other environments. Accordingly, it can be seen that a need exists for a dispenser with a cutting mechanism that provides for reliable cutting or perforation of the sheet material/paper product without bunching or tearing, while also reducing noise generated as the sheet material is dispensed, and which addresses the foregoing and other related and unrelated problems in the art.

SUMMARY

Briefly described, according to aspects of the present disclosure, a dispenser for dispensing or distributing a selected/predetermined amount of sheet material, such as tissue or other paper products is provided, having a housing with a feed roller assembly rotatably mounted therein. The feed roller assembly can be configured/arranged to guide or feed a selected amount of sheet material out of a discharge chute of the dispenser housing. A cutting assembly or system further can be arranged adjacent or along the feed roller assembly, which cutting assembly will include a cutting portion configured to at least partially cut or perforate the sheet material at an interval, or upon feeding or passage of a selected/predetermined amount of sheet material, adjacent the cutting portion during or prior to the sheet being dispensed. The cutting assembly further can be in communication with the feed roller assembly so as to be actuatable and/or movable in coordination with the rotation thereof such that as the feed roller is rotated to dispense the sheet material, the cutting assembly can be actuated/moved to bring the cutting portion into engagement with the sheet material, whereupon the sheet material is at least partially cut or perforated so as to define or delineate a sheet of selected/predetermined amount/length for dispensing.

In one aspect, the cutting assembly or system can be integrated with a feed roller body of the feed roller assembly, for example, components or parts of the cutting mechanism, such as a blade or knife of the cutting portion, are at least partially disposed or housed within a cavity or chamber defined in or along the feed roller body. The blade of the cutting portion of the cutting system can include a series of teeth or serrated portions and can be extendable or movable at least partially out of one or more slots or openings defined along the feed roller body. The cutting assembly further can include a base or support portion pivotally or rotatably mounted within the feed roller body, and one or more follower arms, each having a body movably coupled to the feed roller body, so as to be movable/rotatable therewith. The follower arms further can be connected to, or otherwise in communication with the base of the cutting assembly, including being fixedly or adjustably connected to the base of the cutting assembly. In addition, each of the follower arms can include a cam or follower located at a second end of each follower arm and movable along a track or race defined along the dispenser housing, e.g., in or along one or more of the side walls of the dispenser housing.

As the feed roller body is rotated during a dispensing operation to dispense a selected portion of the sheet material, the followers of each of the follower arms of the cutting system will be guided or moved along the race or track defined along the dispenser housing. This track further can be configured so that, as the follower is moved therealong, its follower arm will be actuated or moved in relation to the feed roller body, causing the base portion to be moved or pivoted to extend the cutting portion at least partially out of the one or more slots or openings in the feed roller body sufficient to at least partially cut or perforate the sheet material. The cutting portion further generally will be moved into or toward engagement with the sheet material in a manner that substantially prevents bunching, ripping, or inconsistent cutting thereof. For example, the cutting portion generally will be moved radially out of the feed roller body, moving with the rotation of the feed roller body in a manner such that the teeth of the cutting portion do not drag against or scrape the sheet material. The cutting portion further may initially contact at least a portion of the sheet material at a prescribed/predetermined angle.

These and other advantages and aspects of the embodiments of the disclosure will become apparent and more readily appreciated from the following detailed description of the embodiments and the claims, taken in conjunction with the accompanying drawings. Moreover, it is to be understood that both the foregoing summary of the disclosure and the following detailed description are exemplary and intended to provide further explanation without limiting the scope of the disclosure as claimed.

BRIEF DESCRIPTION OF THE DRAWINGS

The accompanying drawings, which are included to provide a further understanding of the embodiments of the present disclosure, are incorporated in and constitute a part of this specification, illustrate embodiments thereof; and together with the detailed description, serve to explain the principles of the embodiments discussed herein. No attempt is made to show structural details of this disclosure in more detail than may be necessary for a fundamental understanding of the exemplary embodiments discussed herein and the various ways in which they may be practiced.

DETAILED DESCRIPTION

Figure 1A:
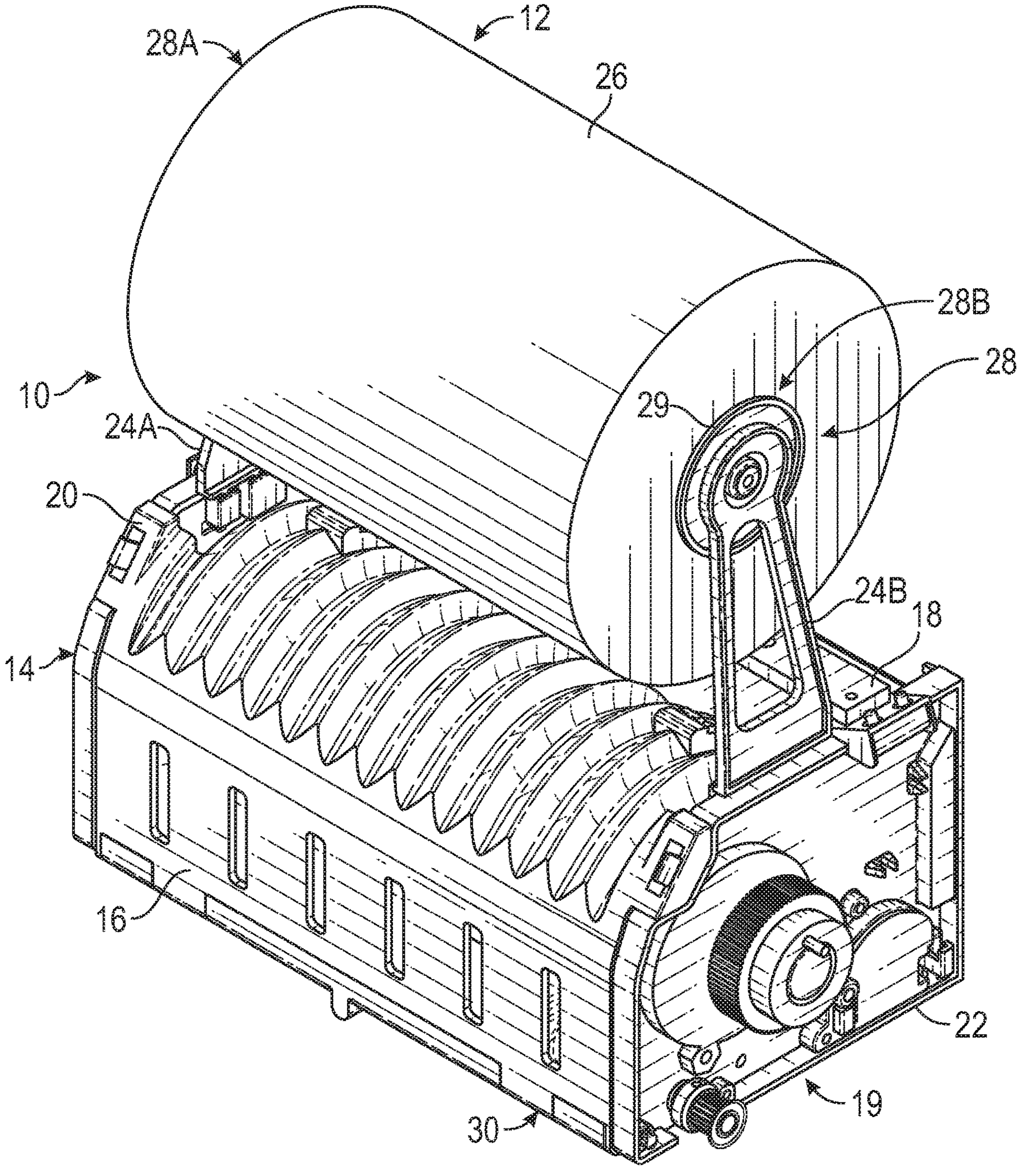
FIGS. 1A-B show partial cutaway, perspective views of dispensers that dispense a sheet material according to principles of this disclosure.
Figure 1B:
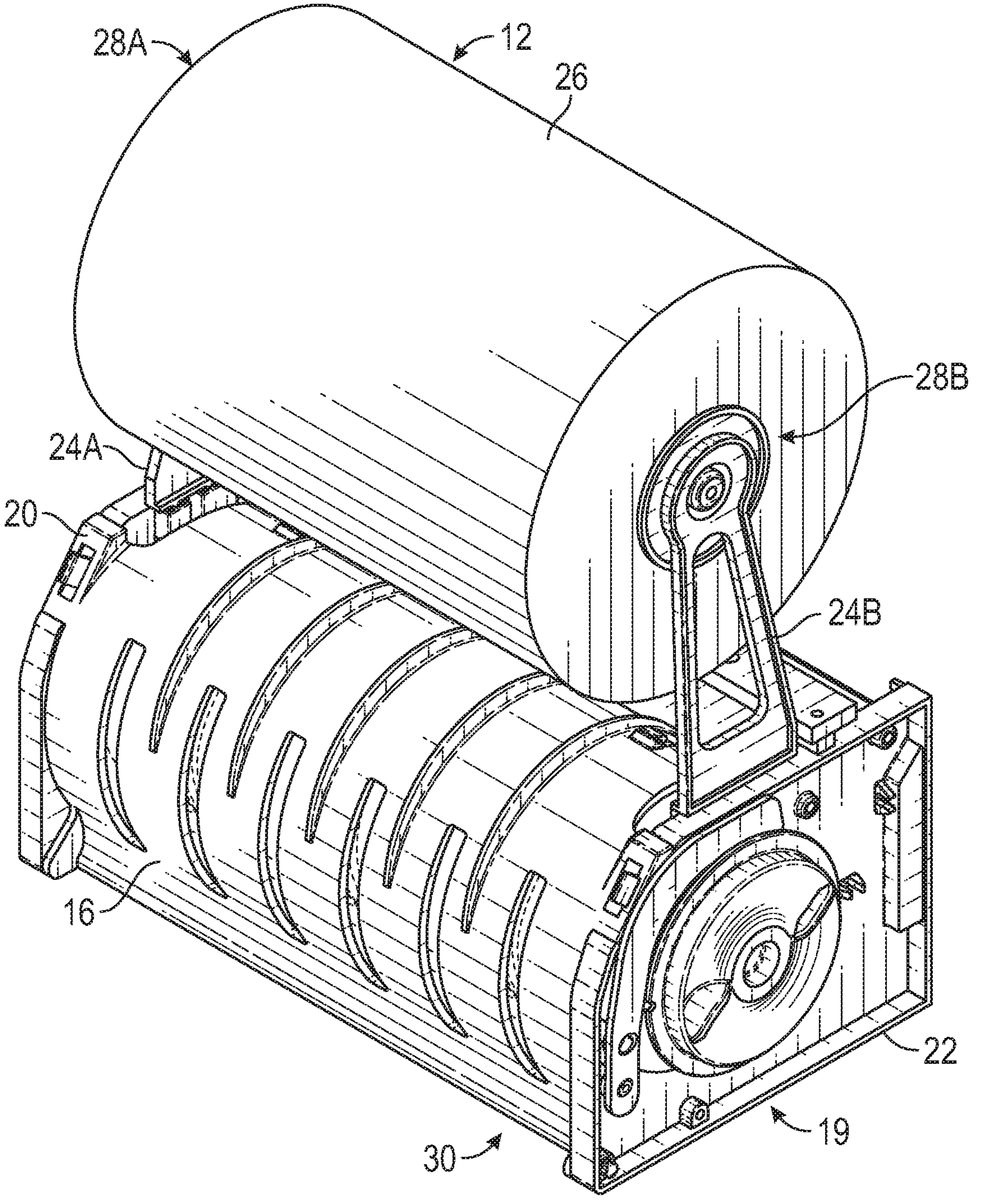

As shown in FIGS. 1A-8, the present disclosure is directed to a dispenser assembly including a dispenser 10 and a supply 26 of sheet material 12, the supply 26 including sheet material 12, such as paper towel, tissue and/or other types of flexible sheet materials. The dispenser 10 has a rotatable feed roller assembly 4 for guiding or dispensing the sheet material 12, e.g., from a roll 28 or other supply arrangement, along a feed path 33 towards a discharge chute 30. The dispenser 10 also may have a cutting assembly 5 in communication with the feed roller assembly 4, and configured to at least partially cut or perforate the sheet material at a selected location or interval during, or prior to, dispensing of the sheet material to form separated/separable sheets of a prescribed or desired length (e.g., about 8" to about 12"), though greater or lesser sheet lengths also can be provided, and with the feed roll of the feed roll assembly generally being selected to provide a paper length as set or desired for the particular use or customer. The cutting assembly 5 may be integrated with the feed roller assembly 4 and in communication therewith such that as the feed roller assembly 4 is rotated, at least a portion of the cutting assembly 5 can be moved or extended at least partially out of the feed roller and into engagement with the sheet material, to at least partially cut or perforate the sheet material in a manner that substantially prevents bunching, ripping, tearing, or inconsistent feeding of the sheet material 12 for dispensing the desired length sheets.

FIGS. 1A-3B show that the dispenser 10 may include a dispenser housing 14 generally having front 16, rear 18, bottom 19 and side 20/22 walls or portions. The side walls 20/22 of the dispenser housing 14 can be coupled or otherwise connected to a support mechanism 24, such as a pair of support arms 24A-B that support or hold the supply 26 of the sheet material 12. Additionally, the housing 14 may have a casing or cover 15 sized, dimensioned, or otherwise configured to at least partially enclose or cover the supply 26 of sheet material 12 and other components of the dispenser 10 within the housing (FIG. 2A-3B). The supply 26 of sheet material 12 may include a supply roll 28 that is rotatably mounted to the support arms 24, at one or more of its ends 28A/B, such as by one or more couplings or bushings 29, to enable the sheet material 12 to be dispensed or fed out of a dispensing throat or discharge chute 30 or other suitable aperture or opening provided along the dispenser housing 14, which discharge chute 30 may be positioned along the bottom portion 19 of the housing 14 as generally indicated in FIGS. 1A-B. The support mechanism, however, is not limited to a pair of support arms 24 and may include any suitable support mechanism or connection that allows for storage and dispensing of the supply 26 of sheet material 12, for example, the ends 28A/B of the supply roll 28 can be connected or otherwise rotatably fixed to the dispenser housing 14 by one or more brackets connected to the dispenser housing 14, or the ends 28A/B of the supply roll 28 may be disposed or arranged at least partially within one or more receptacles, grooves or slots defined along the dispenser housing.

Figure 2A:
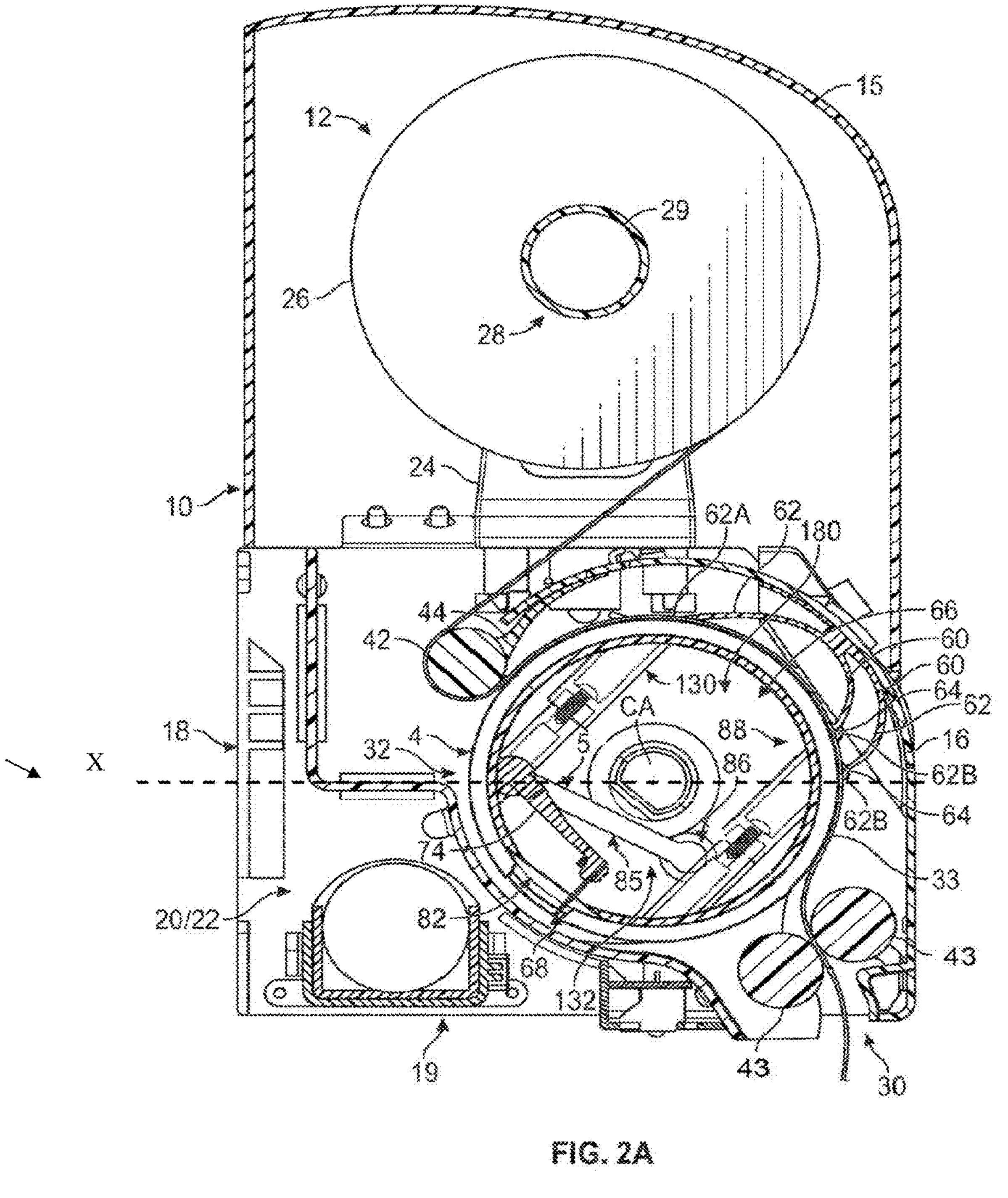
FIGS. 2A-C show side cross-sectional views of the dispenser of FIG. 1A.
Figure 2B:
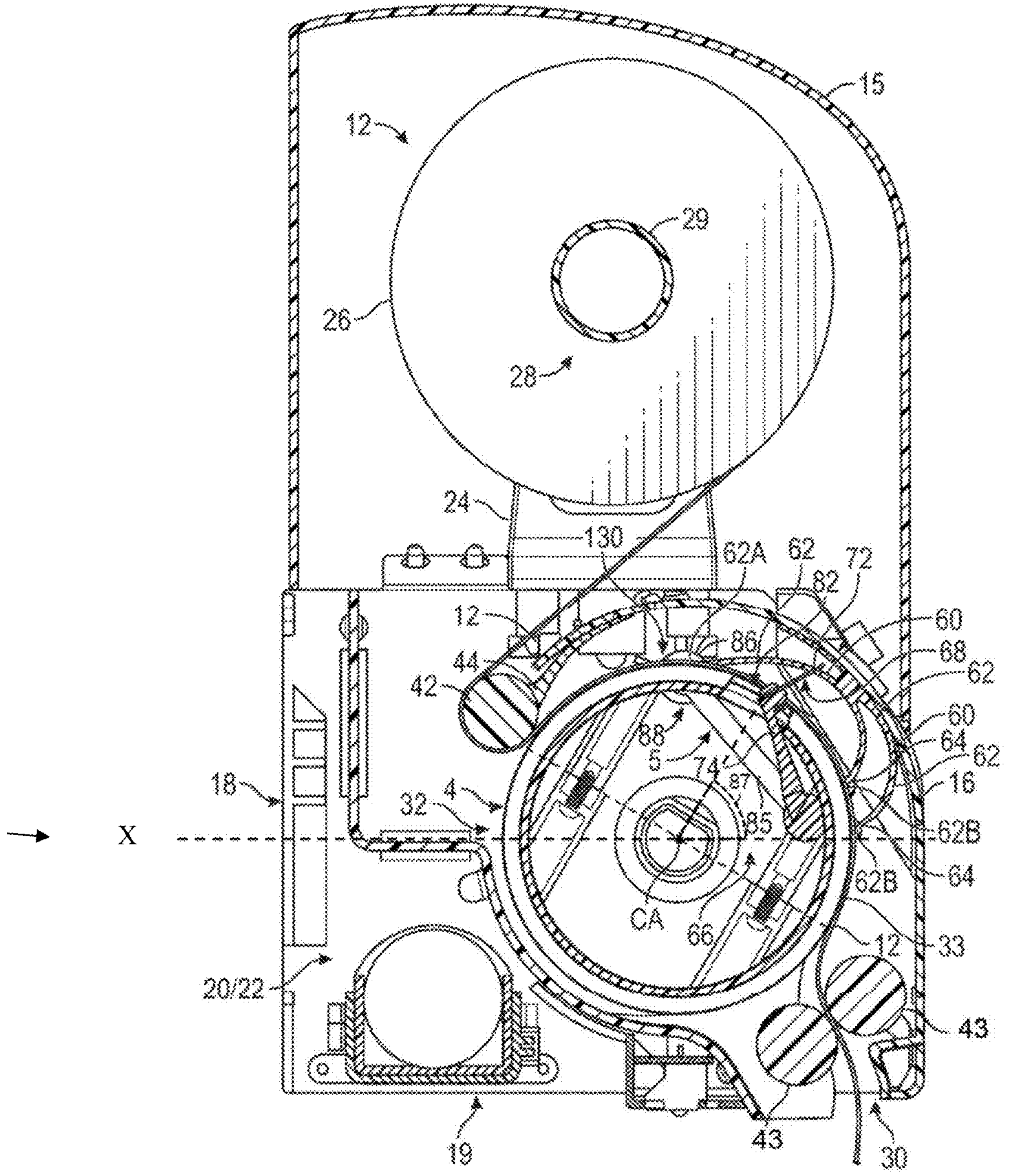
Figure 2C:
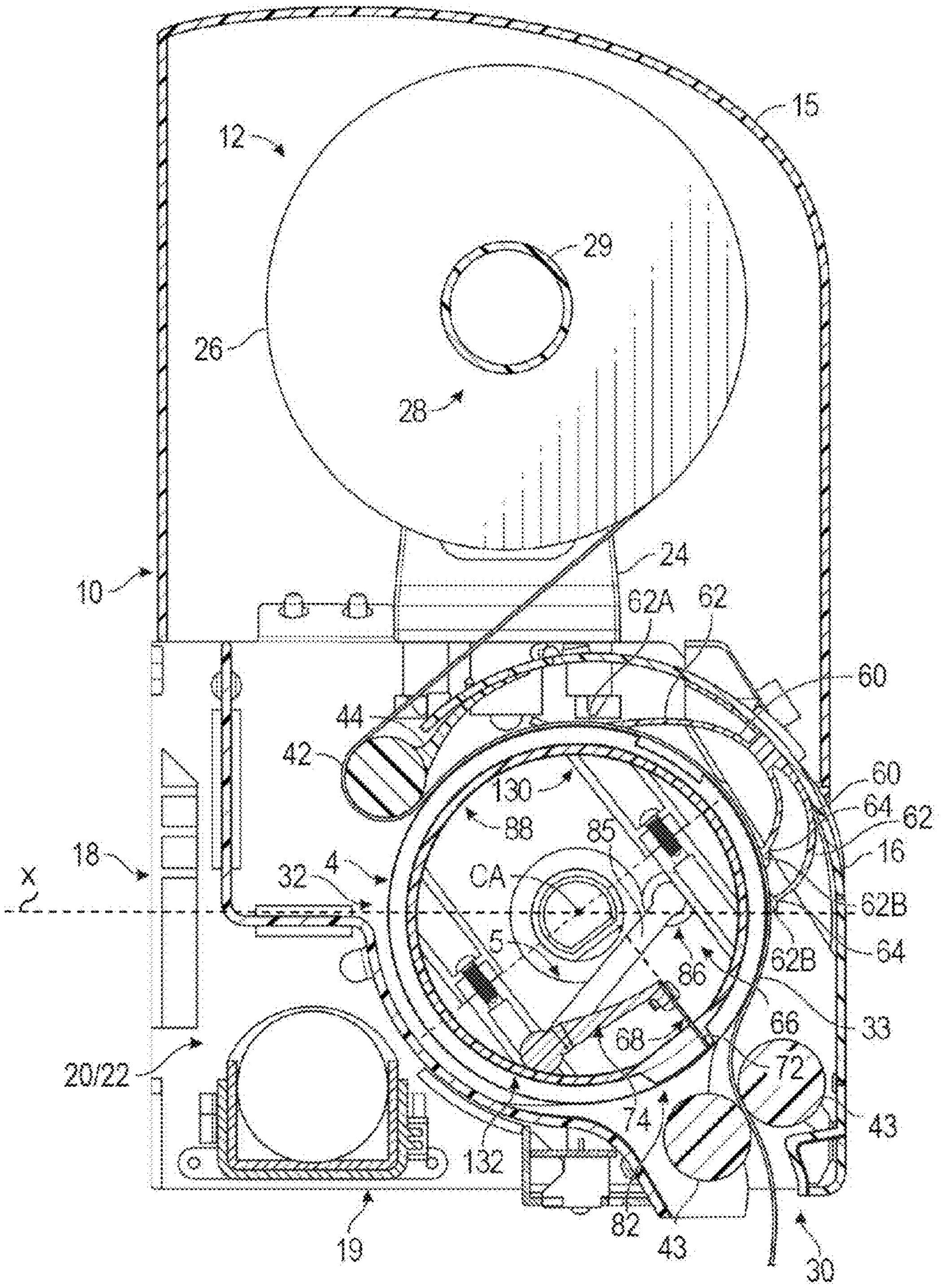
Figure 3A:
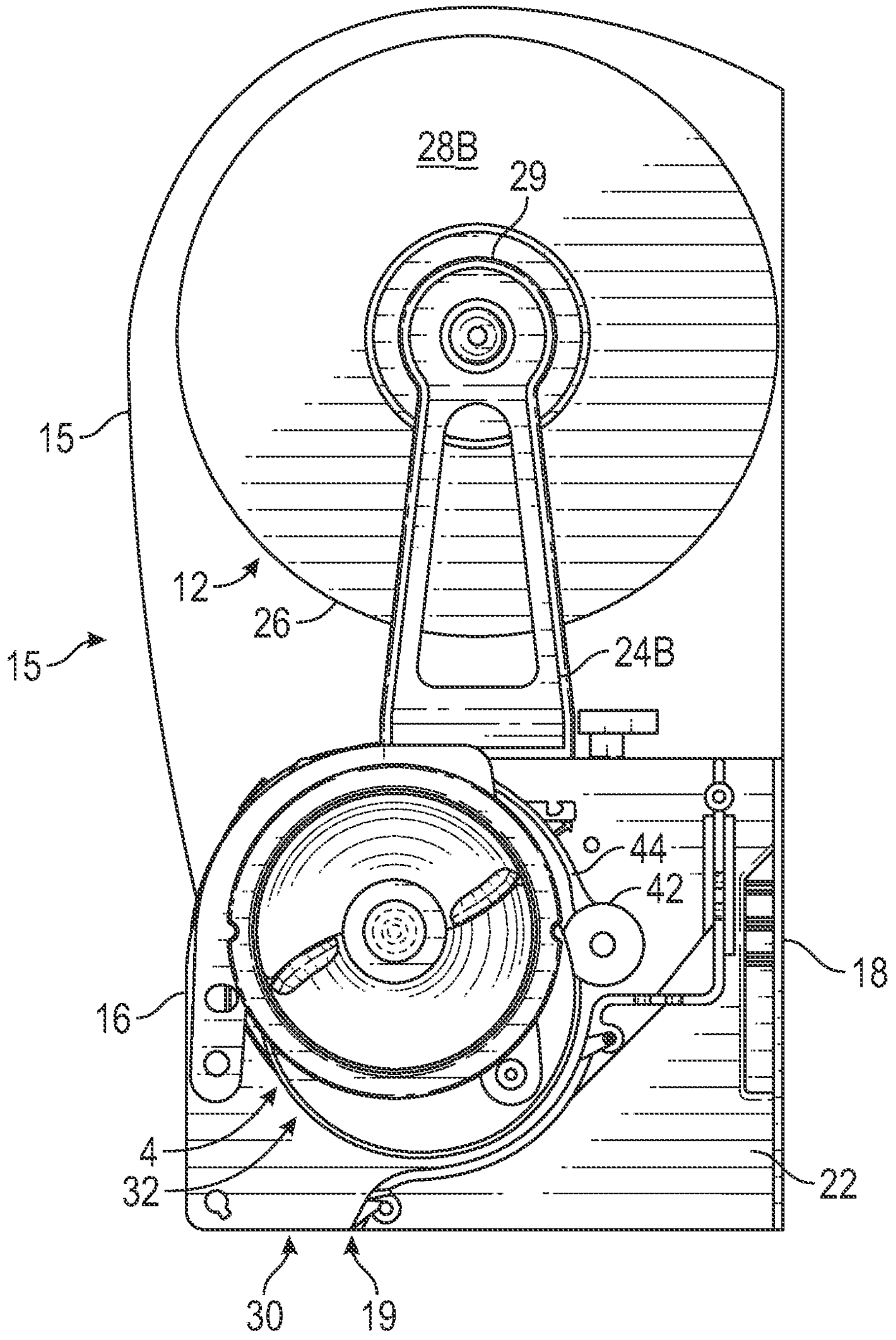
FIGS. 3A-B show a side and front cross-sectional views according to FIG. 1B.
Figure 3B:
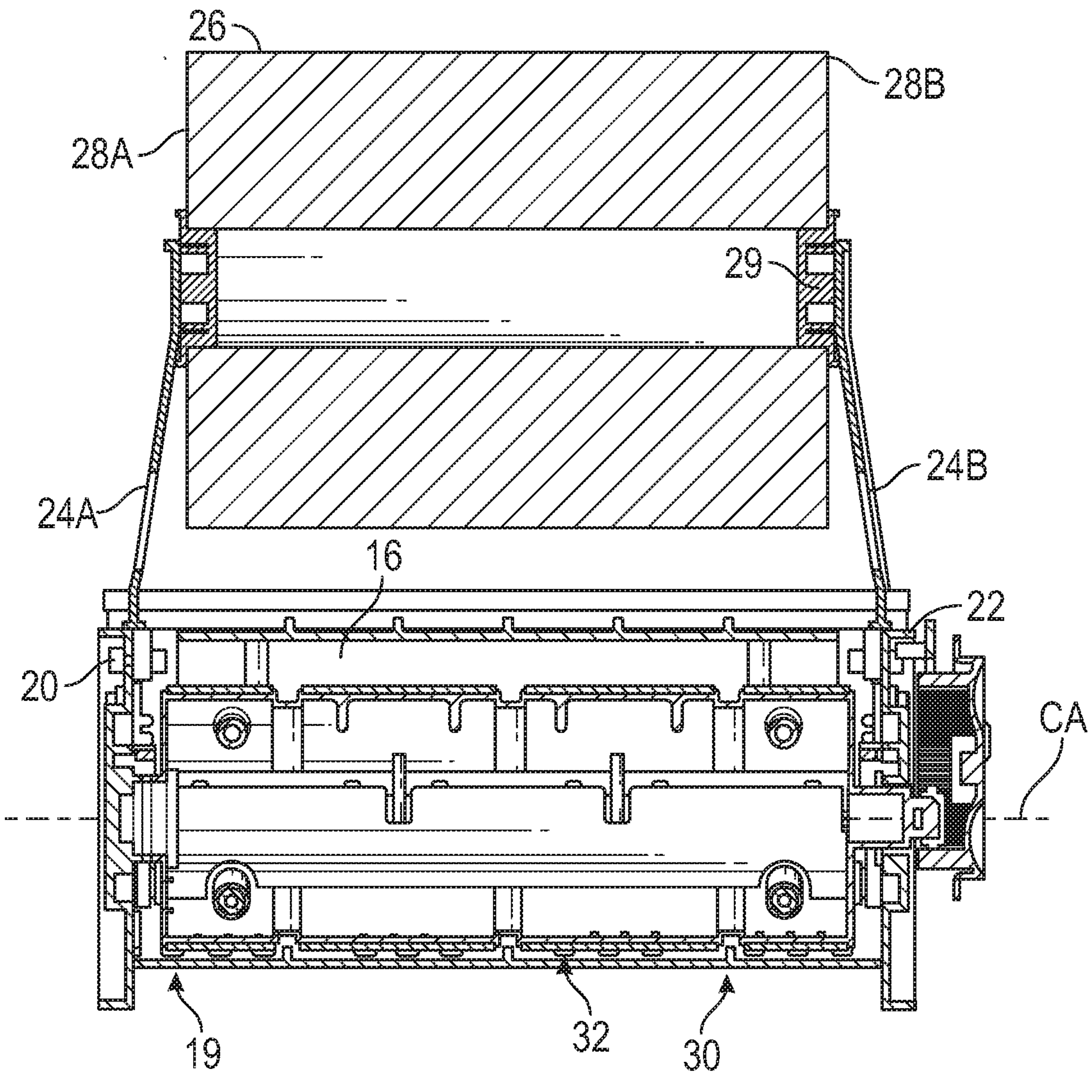
Figure 4A:
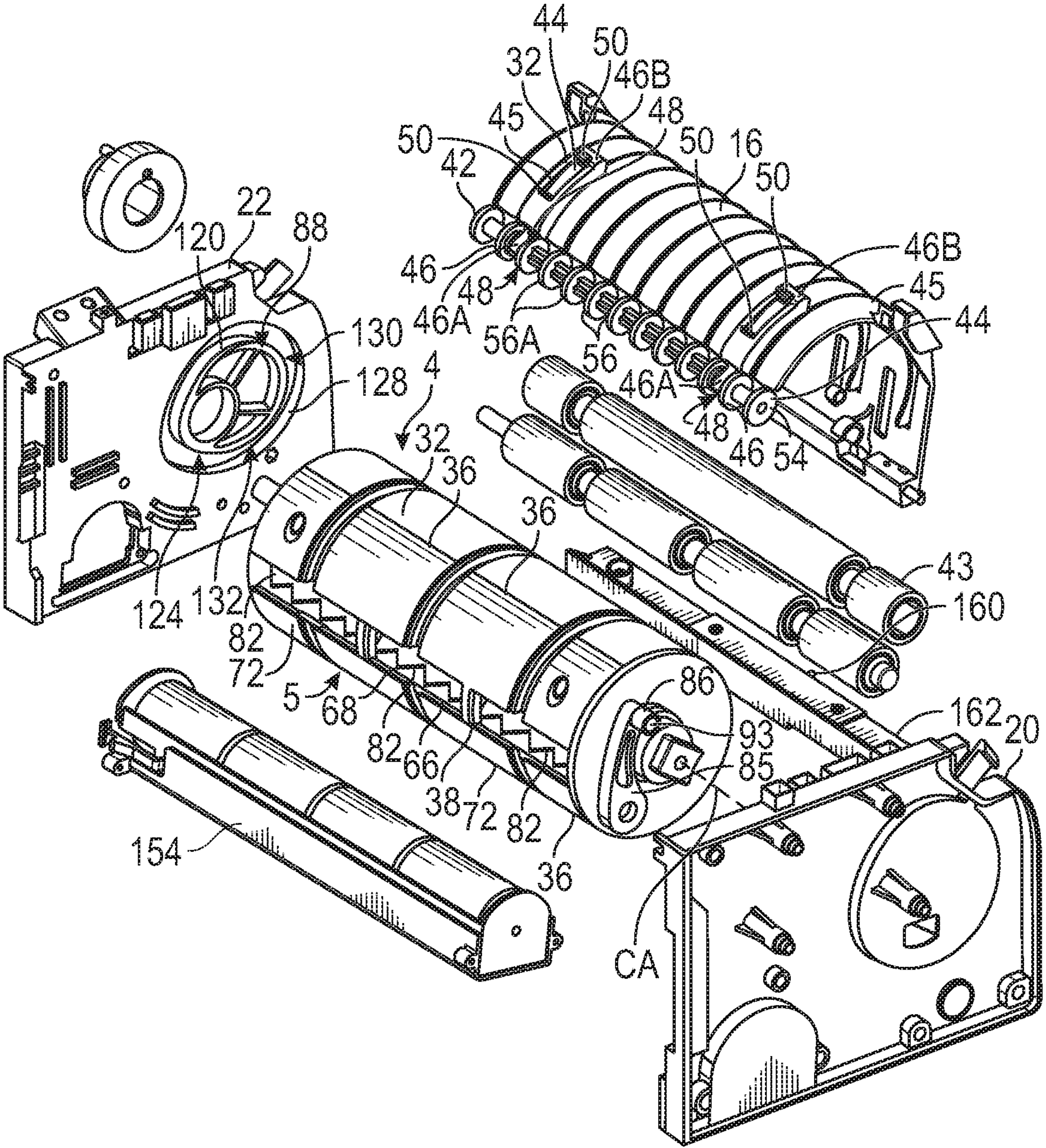
FIGS. 4A-B provide exploded views of the dispenser of FIG. 1A.
Figure 4B:
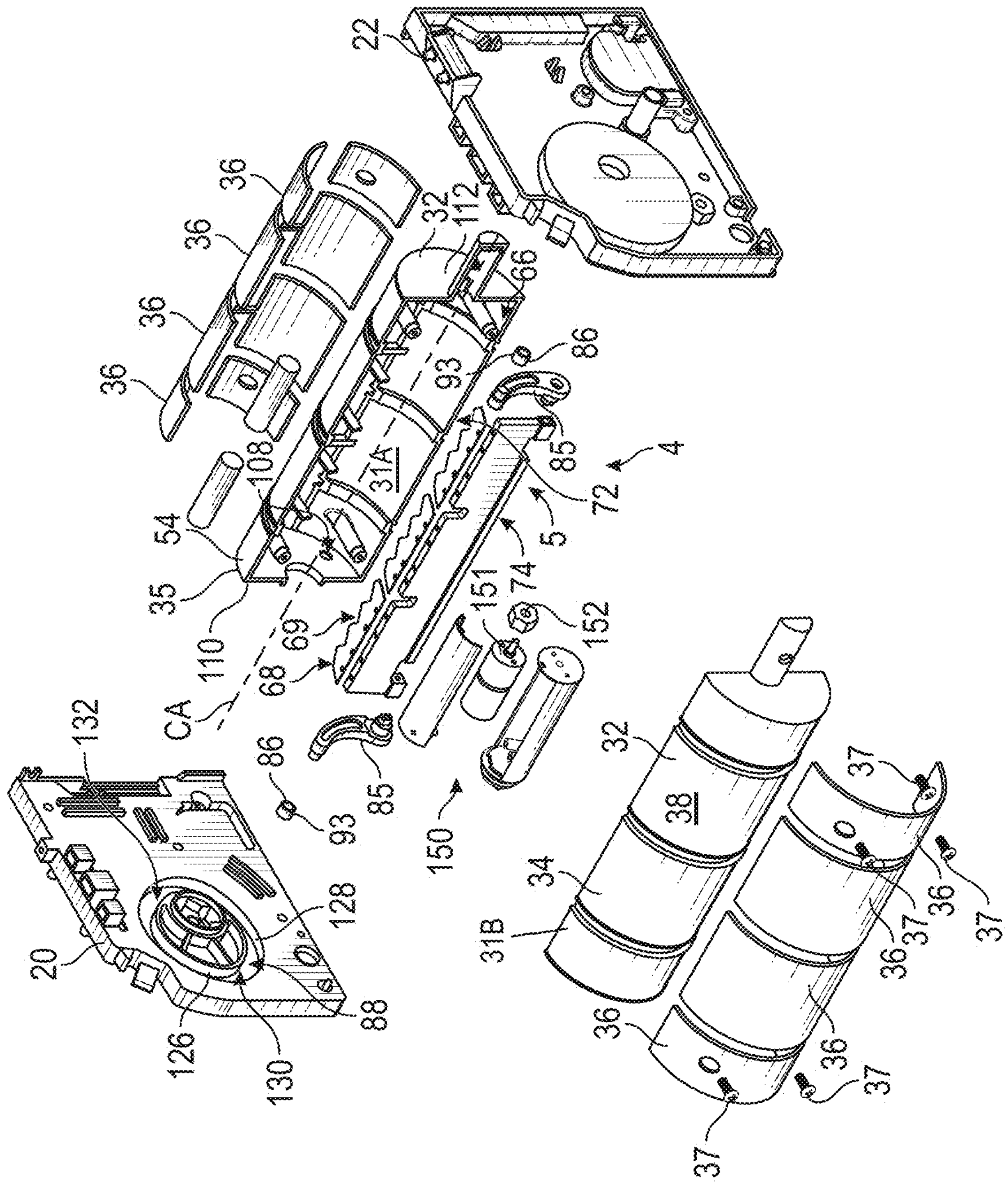
Figure 5A:
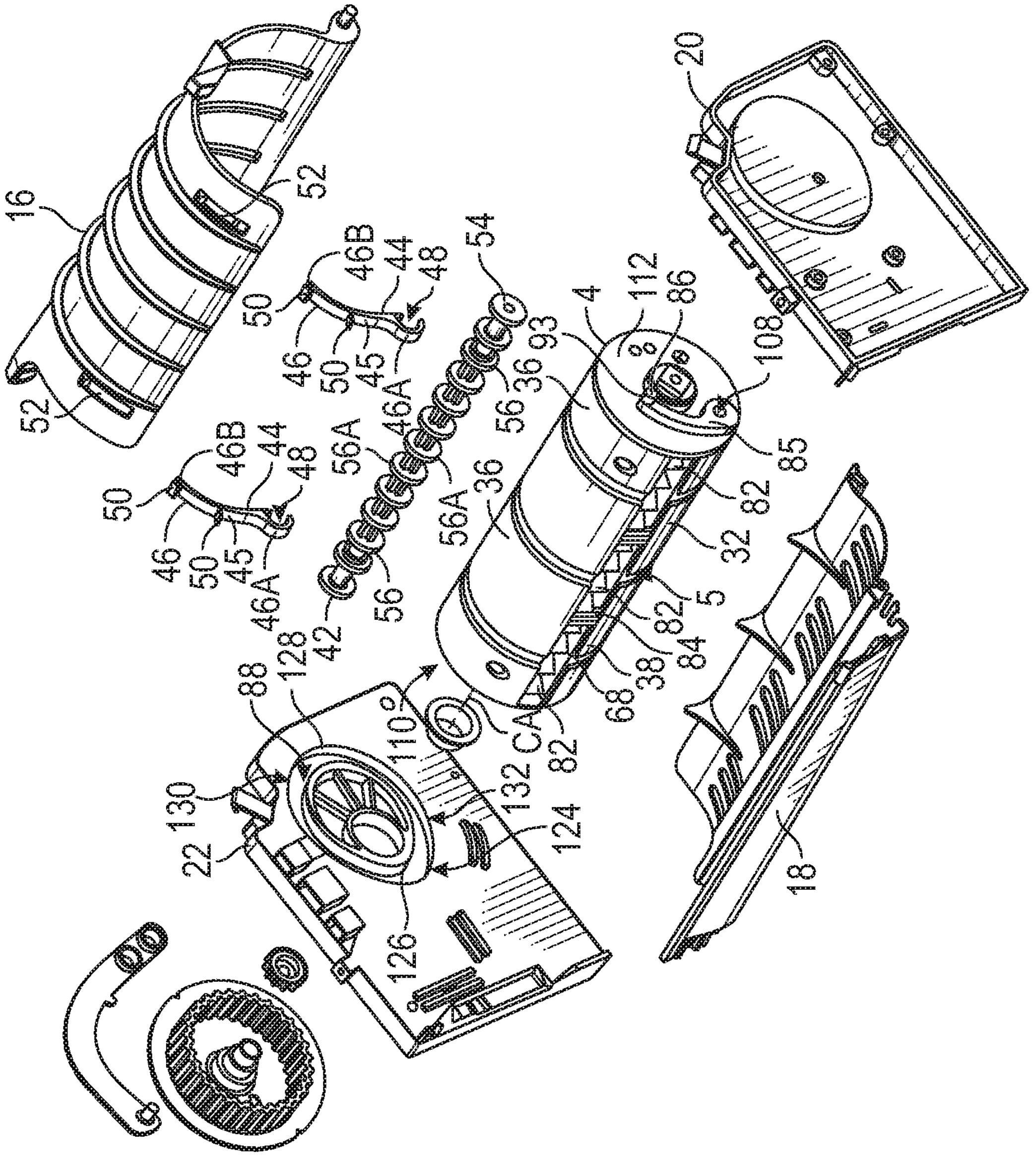
FIGS. 5A-B show exploded views of the dispenser of FIG. 1B.
Figure 5B:
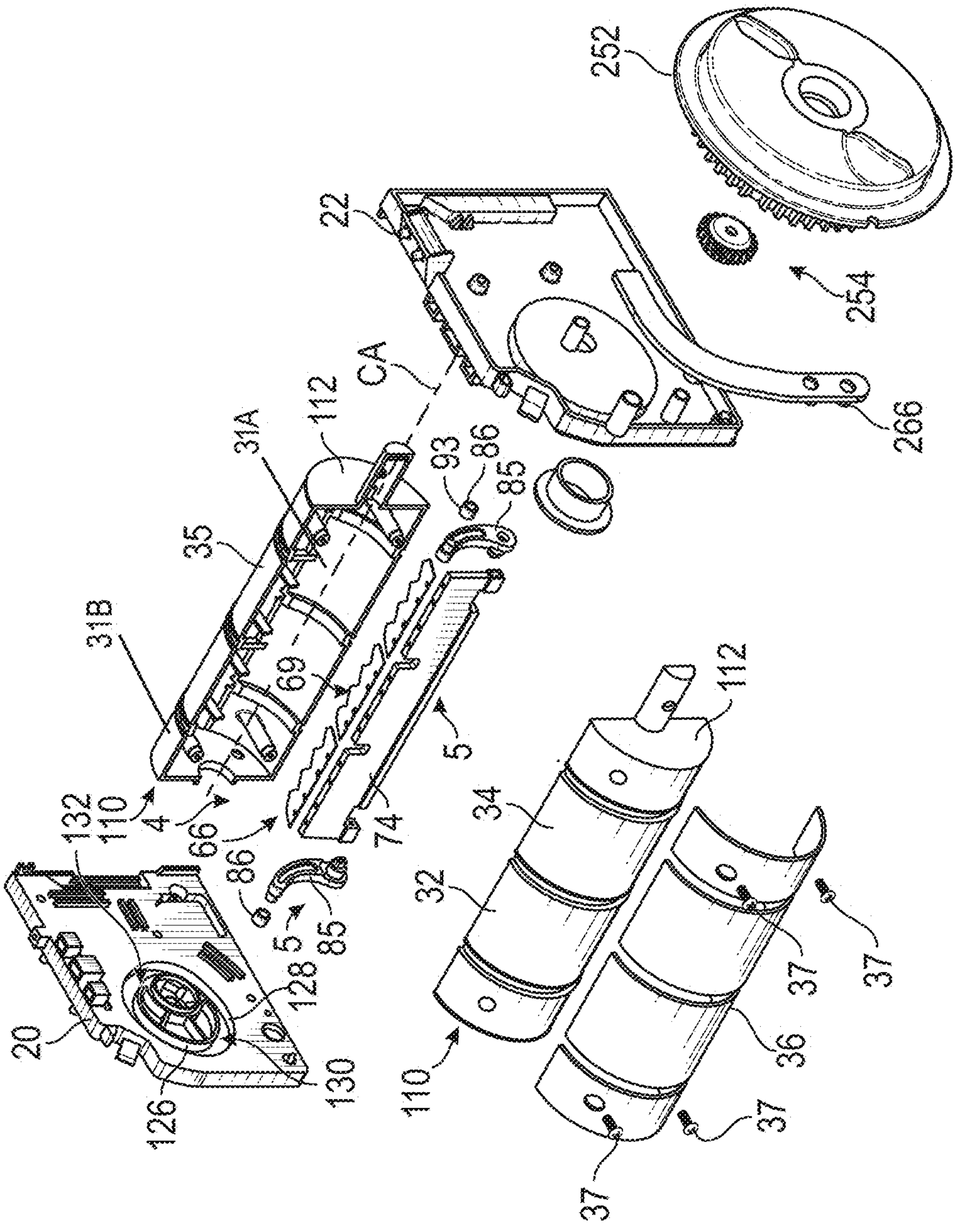

Additionally, as shown in FIGS. 4A-5C and 7-8, the feed roller assembly 4 is mounted within the dispenser 10 and is configured to guide or drive the sheet material 12 along a distribution path 33 from the supply 26 to and out of the discharge chute 30 for dispensing or distribution of the selected or predetermined amount of the sheet material 12 (FIGS. 2A-C). The feed roller assembly 4 generally will include an elongated feed roller body 32 having an inner wall 31A (FIGS. 4B and 5B) and an outer wall 31B, with a cavity or chamber 66 defined within the interior of the feed roller body 32. The feed roller body can comprise a molded plastic, synthetic or other composite material, though other types of low or reduced static materials, such as wood and/or other materials, which also can include an insulating material applied thereabout, also can be employed. The feed roller body 32 may include a pair of substantially symmetrical hemispherical portions or sections 34/35 that can be mated together, such as by fasteners 37, though other suitable connections are possible such as one or more snap fittings, adhesives, etc. The feed roller body 32 will be connected to or otherwise disposed within the dispenser housing 14 in a manner so as to be rotatable for feeding, guiding or driving/pulling the sheet material 12 from its supply during a dispensing operation. The feed roller body 32 also can include one or more drive bands or belts 36 formed/disposed on, or coupled to, an outer or exterior surface 38 thereof. Such drive belts can include or be comprised of rubber, plastic, or other similar materials suitable to increase grip of the feed roller body and/or friction between the feed roller body and the sheet material 12, which can be engaged and pulled between the feed roller and one or more idler or pressing rollers 42 to thereby assist in the guiding, feeding or driving of the sheet material 12 as it is dispensed. It should be understood that, although FIGS. 4A-5B show four substantially equally spaced driving bands or belts 36, any number, size, arrangement and/or configuration of driving bands may be used without departing from this disclosure.

FIGS. 2A-2C, 3A, 4A, and 5A further illustrate that the dispenser housing 14 can include one or more pressing rollers 42 or other guide members at least partially arranged therein substantially proximate, or substantially adjacent to, the feed roller body 32. For example, as shown in FIGS. 2A-C, 3A, 4A, and 5A, at least one pressing roller 42 may be rotatably connected to the front portion 16 of the dispenser housing 10, such as by one or more arms or supports 44. The supports/arm 44 may include a body 46 that defines a recess or groove 48 at a first end 46A of the body that is configured, sized, or dimensioned to receive at least a portion of the pressing roller 42. The body 46 of the arms/supports 44 may also have protuberances or projections 50, such as along a top portion 45 or second end 46B of the body 46, which protuberances or projections 50 are configured to be at least partially received within one or more grooves or holes 52 defined along the front portion 16 of the dispenser housing, for example, to enable snap-fitting therein. The arms 44 further may bias or urge the pressing roller 42 against the feed roller body 32 so as to engage at least a portion of the sheet material 12 between the pressing roller 42 and feed roller body 32.

The pressing roller(s) 42 further may comprise a body 54 defined by a series of spaced portions 56 each having a radial surface 56A for engaging at least a portion of the sheet material 12, and can include bands of gripping material, e.g., a rubber or synthetic material, arranged thereabout to assist in pulling or guiding the sheet material 12 between the pressing roller 42 and feed roller body 32 without tearing, or otherwise causing damage to, the sheet material 12. It should be recognized that any number of pressing or guide rollers can be arranged about the feed roller body 32 to assist in guiding the sheet material 12, and any additional rollers may be fixed in a biased or a static arrangement. For example, a pair of idler guide rollers 47 can be arranged or positioned adjacent the discharge chute 30 and rotatably mounted to the sidewalls 20/22 of the dispenser housing 14 to guide or otherwise facilitate discharge of the sheet material from the discharge chute 30. The dispenser 10 further may include one or more fingers or guides 60 for positioning or guiding the sheet material 12 along the feed roller body 32 as the sheet material 12 is fed from the dispenser 10, as generally shown in FIGS. 2A-C. The fingers or guides 60 each can be connected to, or formed with, the front portion 19 of the dispenser housing 14, and can have an elongated body 62 that is curved, or otherwise shaped, such that the body 62 is urged or biased against the feed roller body 32 at first 62A and second 62B ends of the body 62, or other portions thereof. The body 62 generally will have cylindrical shape, though other shapes are possible, and the body 62 may have spherical portions 64 positioned along one or more of its ends, e.g., first end 62A or second end 62B.

Figure 6A:
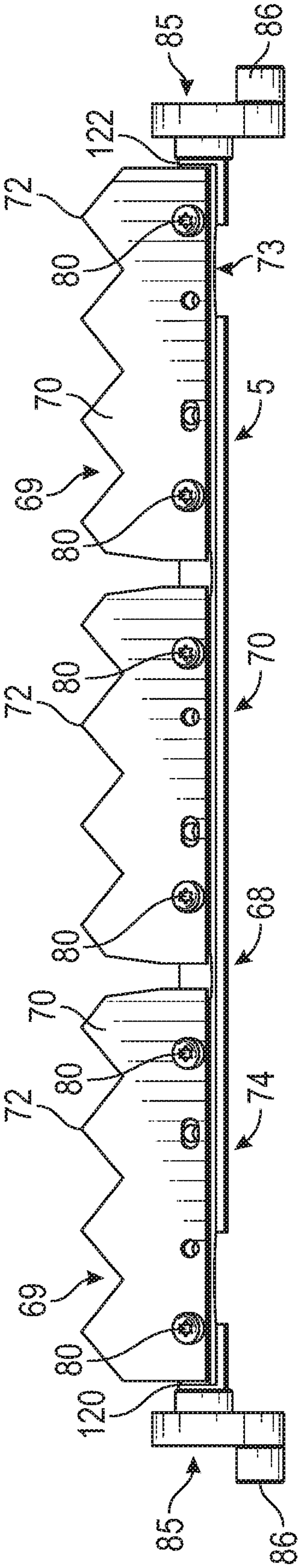
FIGS. 6A-C show top, perspective, and exploded views of a cutting assembly according to principles of this disclosure.
Figure 6B:
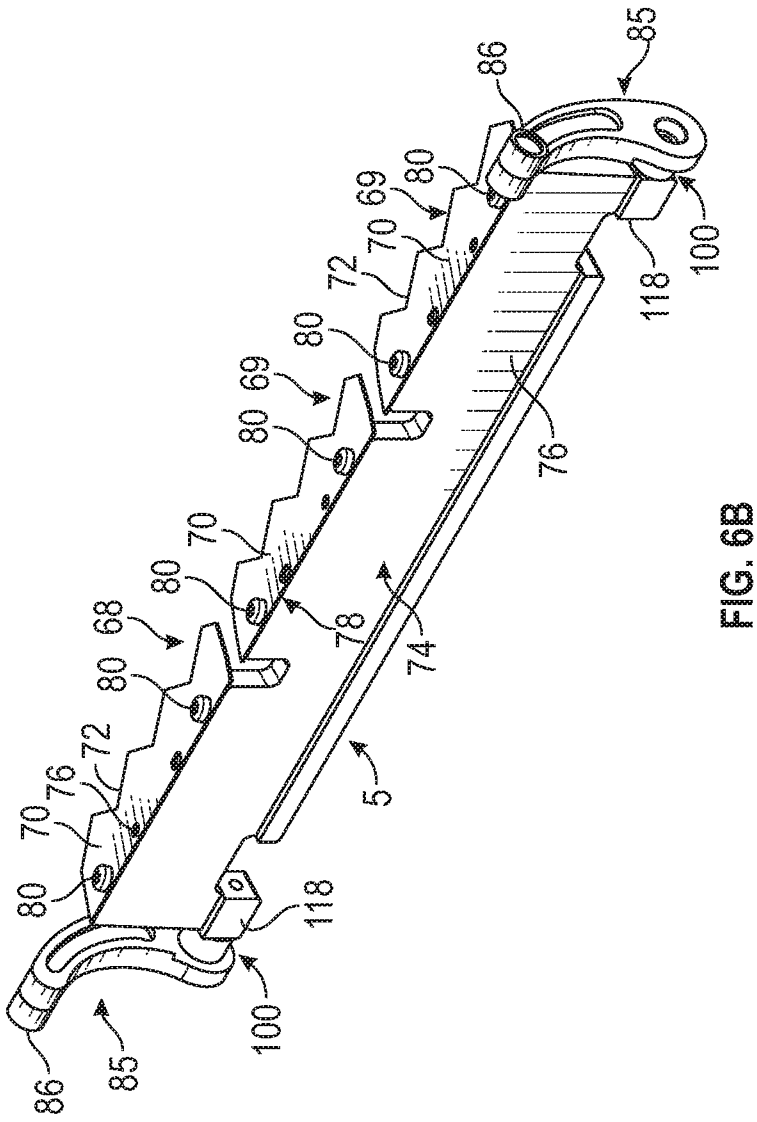
Figure 6C:
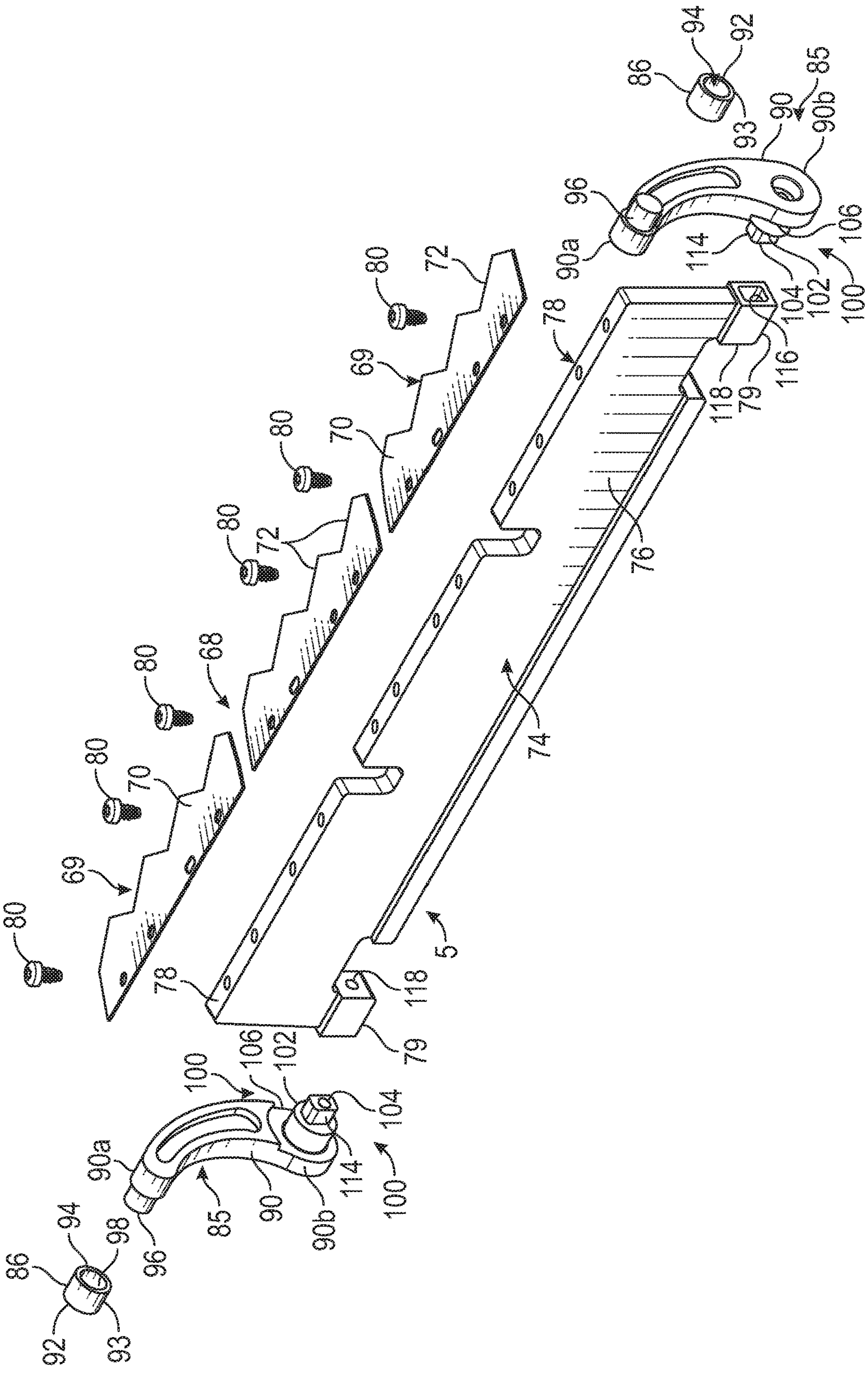
Figure 7:
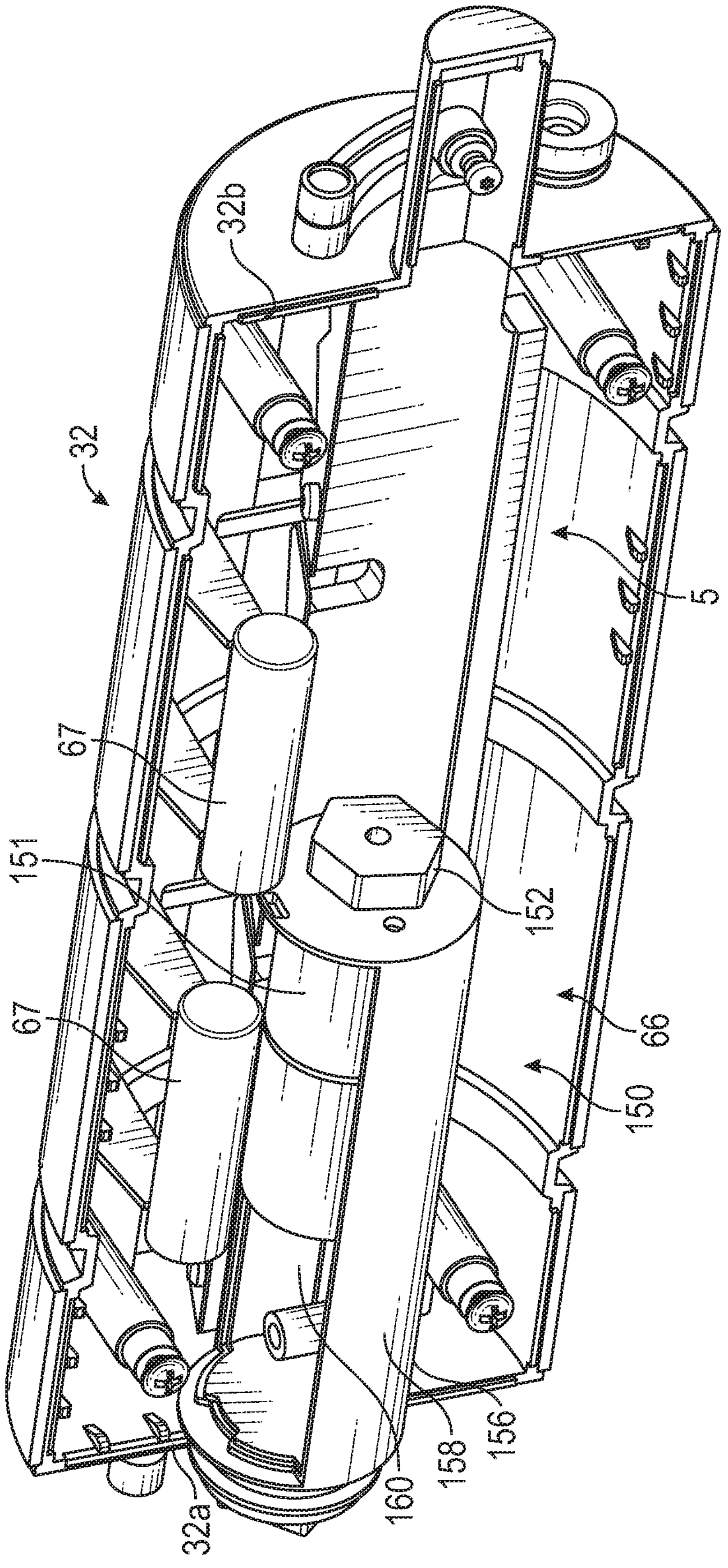
FIG. 7 shows a partial cutaway, perspective view of a driven feed roller according to principles of this disclosure.
Figure 8:
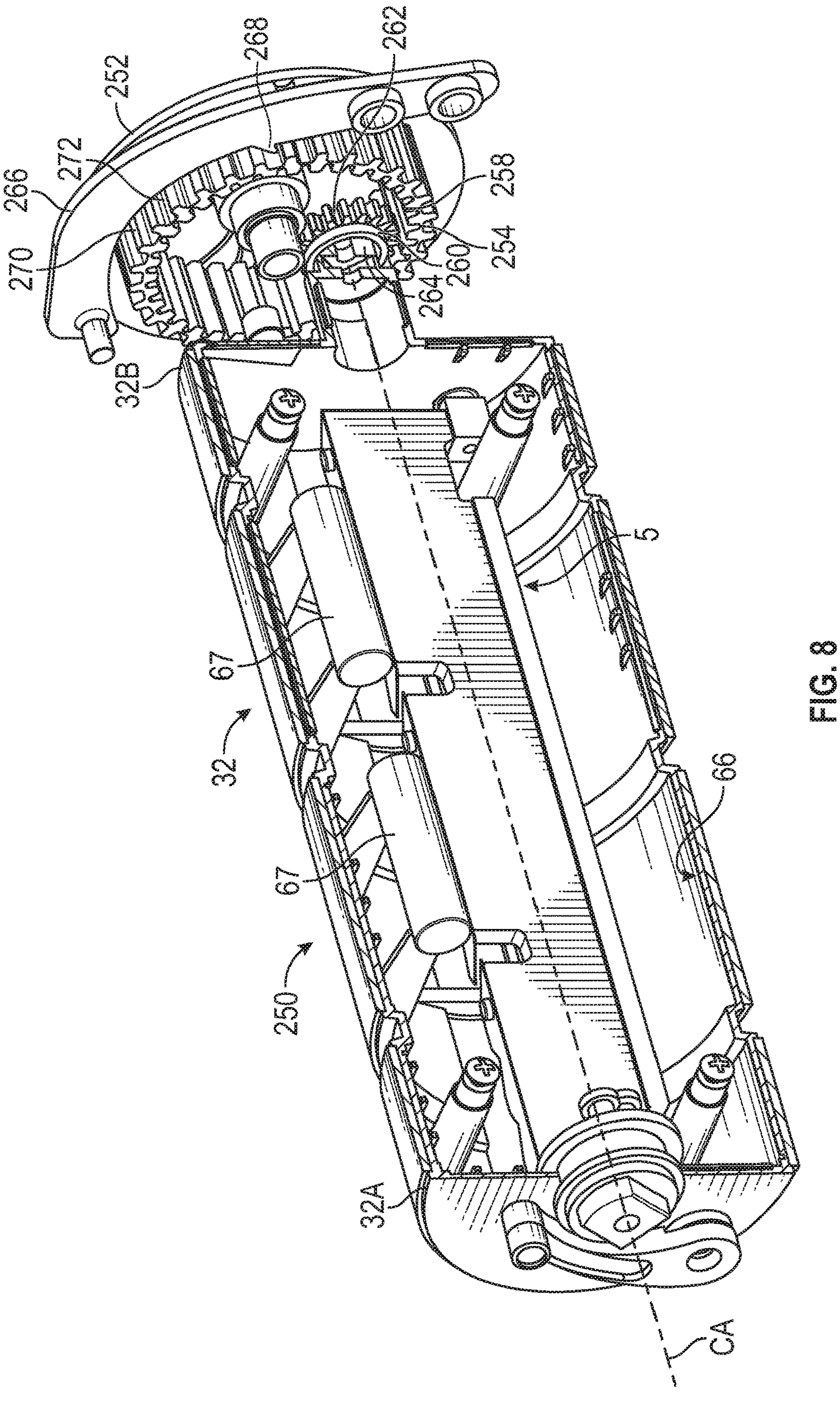
FIG. 8 shows a partially cutaway, perspective view of a manually driven feed roller according to principles of this disclosure.

As shown in FIGS. 2A-8, the dispenser 10 will include a cutting assembly 5 arranged along the feed roller body 32, which cutting assembly 5 can be integrated with the feed roller body 32. For example, as shown in FIGS. 4B and 5B, the cutting assembly 5 can be at least partially arranged or housed within the cavity or chamber 66 defined within the interior of the feed roller body 32. As shown in FIGS. 7-8, the feed roller body 32 can have counterweights 67 arranged therein to counterbalance or otherwise compensate for the integrated cutting assembly, and which can help substantially balance rotation, and/or further drive of the feed roller body 32 (i.e., driving manual operation thereof) as needed. The cutting assembly 5 further can be movable, with rotation of the feed roller body 32, to engage and at least partially cut or perforate the sheet material 12 during, or prior to, dispensing of the sheet material 12 from the dispenser 10. The cutting assembly 5 will include a cutting portion or component 68 having at least one body 70 that includes a front portion or end with a cutting edge 69, such as a cutting blade that also can have a series of teeth 72 or other serrated, jagged or saw-like portions. However, the cutting edge 69 can include any other sharpened portions suitable to at least partially cut or perforate the sheet material, such as a knife or bladed cutting edge, or other suitable cutting mechanisms, without departing from this disclosure. The cutting component 68 also can include a series of generally symmetrical spaced bodies 70, e.g., three bodies 70 each having a series of teeth 72, such as shown in FIGS. 6A/C; however, the cutting component 68 can have any number, arrangement, or configuration of cutting portions or mechanisms without departing from this disclosure. The body/bodies 70 of the cutting component 68 further can be formed from a metal, e.g., aluminum or light-gauge steel, though other suitable materials, such as a plastic or other composite material, also can be used without departing from this disclosure.

Additionally, as shown in FIGS. 2A-8, the cutting assembly 5 also can include a base or support 74 having a body 76 with a generally rectangular or plate-like shape, though other shapes are possible without departing from this disclosure. The cutting portion 68 may be coupled, connected, or otherwise fixed along first end 78 of the body 76 of the base 74, such as by one or more threaded fasteners 80, e.g., screws or bolts, can be integrally formed therewith, without departing from this disclosure. The base 74 can have a height or lengths sufficient to fit within and move into/out of the feed roller without interference or binding therewith. For example, the base can range from about 25 mm to about 45 mm in length. The base 74 can be movably mounted within the feed roller body 32 such that the base 74 moves, e.g., rotates or pivots, with rotation of the feed roller body 32, and is further movable radially so at least the cutting edge 69 of the cutting component 68 will be at least partially extended out from one or more openings or slots 82 defined along the feed roller body 32, e.g., the cutting edge or teeth 72 of the of the cutting portion 68 can move out of a slot or series of corresponding openings or slots 82 defined along the outer circumferential wall 84 of the feed roller body 32, sufficient to at least partially cut or perforate the sheet material 12. Although a series of evenly spaced slots 82 are shown, any number, arrangement or configuration of slots, e.g., one continuous slot or multiple slots/openings, also can be employed without departing from this disclosure.

As further shown in FIGS. 2A-8, the base 74 will be connected to, or otherwise in communication with, one or more lever or follower arms 85, which follower arms 85 generally will also be coupled to the body 32 of the feed roller assembly 4 so as to be rotatable therewith. Each of the follower arms 85 further will include a follower 86 configured to move or ride along a track or race 88 that can be formed, defined or arranged along the dispenser housing 14, as the feed roller body 32 rotates to dispense the sheet material 12. As generally shown in FIGS. 2A-C, this track or race 88 generally will be shaped, dimensioned, or otherwise configured such that, as each follower 86 is moved therealong, its follower arm is moved in relation to a central axis CA of the feed roller body 32 to rotate or pivot the base 74 in a manner sufficient to thereby move and/or extend the cutting portion 68 at least partially out from (FIG. 2B) and back into (FIG. 2B) the slot(s) or opening(s) 82 in the feed roller body 32.

As generally shown in FIGS. 6A-C, the follower arms 85 may have an elongated body 90 with a generally curved shape sized, dimensioned and/or configured to avoid inhibiting or interfering with movement/rotation of the feed roller 32. The size and/or configuration of the follower arms can vary for supporting different size drums providing for different paper lengths, while also providing sufficient motor clearance during electronic application. The arms 85 further may include any suitable shape, such as generally rectangular, etc., without departing from this disclosure. The body 90 of each follower arm 84 can have a first end 90*a* and second end 90*b*, each with a generally arcuate, curved or semi-circular shape, and with one end, e.g., the first end 90*a*, having a smaller diameter than the other end, e.g., the second end 90*b*, though the first and second ends 90*a*/*b* may have any dimension and/or suitable shape, e.g., an oval, elliptical, square, diamond, or triangular shape or configuration, without departing from this disclosure. The follower 86 of each arm 85 may be arranged along, or substantially adjacent to, the first end 90*a* of the follower arm body 90, with the follower arm 85 connected to the feed roller body 32 and the base 74 of the cutting assembly 5 at its second end 90*b*. The followers 86 will have a body 92 of a generally cylindrical shape rotatably mounted to its arm 85 at 94, e.g., by being fitted on, or otherwise connected to, a fastener pin, projection or protrusion 96 connected to, or formed with, the first end 90*a* of the follower arm 90. For example, the projection/protrusion 96 that is at least partially received within a passage 94 defined in the follower body 92 such that the follower 86 is rotatable or otherwise movable thereabout. The protrusion/projection 96 may have a generally cylindrical shape that is complementary to an interior surface 98 of the follower body 92, though the protrusion/projection 96 can have any shape without departing from the present disclosure.

Additionally, the second end 90*b* of the body 90 of the follower arm 85 can include a mounting portion 100 for connecting the follower arm 85 to the base 74 and the feed roller body 32. This mounting portion 100 can have a first portion 102 pivotably or rotatably coupling the follower arm 85 to the feed roller body 32, and a second portion 104 fixing or otherwise mounting, the follower arm 85 to the base 74 of the cutting assembly 5. In one example, the first portion 102 can include a generally cylindrical body 106 at least partially received within a hole or aperture 108 defined in the side portions 110/112 of the feed roller body 32 such that the follower arm is rotatable, pivotable, or otherwise movable thereabout to allow for relative movement between the follower arm 85 and the feed roller body 32. The second portion 104 can include a projection or protrusion 114 extending from the first portion 102 and configured to be received within a hole or opening 116 defined along the base 74 of the cutting assembly 5, or within one or more mounting blocks 118 mounted to, or fixed with, the base 74. The mounting blocks 118 can be positioned along the sides 120/122 of the body 76 of the base 74 at or substantially adjacent a second end 79 thereof to fix the follower arm and base to prevent relative movement therebetween.

As shown in FIGS. 4A-B, and 5A-B, the cam tracks or races 88 defined/located along the dispenser housing may include a channel or groove 124 defined in at least one of the side walls 20/22 of the dispenser housing 14. Each channel or groove 124 has opposing facing side walls 126/128 defining guide surfaces along which the follower 86 moves as the feed roller body 32 is rotated. For example, an exterior surface 93 of the follower can at least partially engage and ride along one or both of the side walls 126/128 as the follower is moved along its track/race 88. The channel or groove 124 defines a path that can be curved or have a generally oblong, oval, or elliptical configuration that further can be eccentric or offset with respect to the central axis CA of the feed roller body 32. Each track/race 88 also may have a series of cam sections or areas that cause the follower arm 85 to move radially with respect to the feed roller body 32 to move the cutting portion 68 into and out from the openings/slot(s) 82 in the feed roller body 32.

As further shown in FIGS. 2A-8, the base 74 will be connected to, or otherwise in communication with, one or more lever or follower arms 85, which follower arms 85 generally will also be coupled to the body 32 of the feed roller assembly 4 so as to be rotatable therewith. Each of the follower arms 85 further will include a follower 86 configured to move or ride along a track or race 88 that can be formed, defined or arranged along the dispenser housing 14, as the feed roller body 32 rotates to dispense the sheet material 12. As generally shown in FIGS. 2A-C, this track or race 88 generally will be shaped, dimensioned, or otherwise configured such that, as each follower 86 is moved therealong, its follower arm is moved in relation to a central axis CA that extends laterally through a center portion of the feed roller body 32 as shown in FIGS. 3B, 4A, and 5A, and about which the feed roller rotates, to rotate or pivot the base 74 in a manner sufficient to thereby move and/or extend the cutting portion 68 at least partially out from (FIG. 2B) and back into (FIG. 2B) the slot(s) or opening(s) 82 in the feed roller body 32.

As shown in FIGS. 4A-B, and 5A-B, the cam tracks or races 88 defined/located along the dispenser housing may include a channel or groove 124 defined in at least one of the side walls 20/22 of the dispenser housing 14. Each channel or groove 124 has opposing facing side walls 126/128 defining guide surfaces along which the follower 86 moves as the feed roller body 32 is rotated. For example, an exterior surface 93 of the follower can at least partially engage and ride along one or both of the side walls 126/128 as the follower is moved along its track/race 88. The channel or groove 124 defines a path that can be curved or have a generally oblong, oval, or elliptical configuration that further can be eccentric or offset with respect to the central axis CA of the feed roller body 32. Each track/race 88 also may have a series of cam sections or areas that cause the follower arm 85 to move radially with respect to the feed roller body 32 to move the cutting portion 68 into and out from the openings/slot(s) 82 in the feed roller body 32.

As shown in FIGS. 2A-B, the cutting portion 68 may be in a retracted position within the feed roller body 32, until the feed roller is rotated or moved by an amount sufficient to dispense the selected amount/length of sheet material, whereupon the follower 86 is moved towards and along a first section 130 of the track/race 88 that causes the follower arm 85 to rotate, pivot or otherwise move with respect to the feed roller body 32. As a result, the base 74 of the cutting system 5 is moved/pivoted such that the cutting portion 68 is caused to project and/or at least partially extend out of the slots/openings 82 in the feed roller body to at least partially cut or perforate the sheet material 12 in timed cooperation/coincident movement with the rotation of the feed roller. Subsequently, as shown in FIG. 2C, as the feed roller continues to rotate to pull/feed the selected amount of sheet material 12, the follower(s) 86 will continue to move along a second section 132 of the track/race 88, causing the follower arm 85 to be pivoted, rotated or otherwise moved with respect to the feed roller body 32, to thereby retract or return the cutting portion 68 to its retracted position substantially within the feed roller body 32. As shown in FIGS. 2A-C, the second portion 132 of each track 88 may be closer to the central axis CA of the feed roller than the first portion 130 of each track 88.

As a result of the cooperative radial and rotary movement of the cutting portion of the cutting assembly with the rotation of the feed roller, the sheet material 12 can be at least partially cut or perforated in a substantially consistent manner without generally causing ripping, tearing or bunching thereof. For example, the cutting portion will be moved radially out of the feed roller body 32, while also rotating with the rotation of the feed roller body, such that the teeth of the blade are not dragged or scraped along the sheet material. The blade/teeth may initially contact or engage the sheet material 12 at an angle indicated at 87 of about 40° to about 60° with respect to an axis X (e.g., a horizontally extending axis X shown in FIGS. 2A-2B extending perpendicular to the central axis CA of the feed roller body), and move therewith to create a stamped cutting/slicing action, as shown in FIG. 2B. Additionally, during cutting of the sheet material, the cutting portion may exert a force of about 1 N to about 3 N, e.g., about 1.8 N, on the sheet material.

The automatic dispenser further can have a manual assist mode, wherein the dispenser includes a switch or sensors in communication with the feed roller assembly, such that when a user pulls on a portion of the sheet material, for example, a portion of sheet material extending out of the discharge chute 30, the motor actuates/rotates the feed roller body 32 to assist in dispensing a selected amount of sheet material.

The feed roller assembly also can be manually driven. FIG. 8 shows a feed roller assembly 250 that has manually operable/driven feed roller assembly, e.g., it allows a user to pull on at least a portion of the sheet material or turn a knob or lever 252 to dispense a selected amount of sheet material. The knob or lever 252 can include, or be in communication with, one or more gear assemblies 254 to transfer torque, e.g., caused by rotation of the knob by a user, to the feed roller body 32. For example, gear assembly 254 can be formed with the knob 252 and include a hoop or ring gear 258 with a series of teeth 260 that engage a series of teeth 262 of gear 264 at least partially received within the hoop or ring gear 258 and connected to an end of the feed roller body 32*b*, so that as the knob 252 is actuated, the feed roller body 32 is rotated to dispense a selected about of the sheet material. The gear assembly 254 also can include a stop mechanism 266 with one or more teeth 268 operable to engage corresponding teeth 270 on an outer surface 272 of the hoop gear 258 to prevent reverse rotation of the feed roller 32 and bunching or tearing of the sheet material. The gear assembly 254 further can be biased, e.g., by one or more springs or other suitable biasing mechanism, to rotate the feed roller as, or after, a user actuates the knob 252, or pulls on a portion of the sheet material, to dispense a selected amount thereof. The biasing may cause a selected amount of rotation of the feed roller body so as to return the cutting portion 68 to a position within the feed roller body after manual dispensing and/or cutting of the selected amount/length of sheet material.

The foregoing description generally illustrates and describes various embodiments of the present disclosure. It will, however, be understood by those skilled in the art that various changes and modifications can be made to the above-discussed construction of the present disclosure without departing from the spirit and scope of the present disclosure as disclosed herein, and that it is intended that all matter contained in the above description or shown in the accompanying drawings shall be interpreted as being illustrative, and not to be taken in a limiting sense. Furthermore, the scope of the present disclosure shall be construed to cover various modifications, combinations, additions, alterations, etc., above and to the above-described embodiments, which shall be considered to be within the scope thereof. Accordingly, various features and characteristics of the present disclosure as discussed herein may be selectively interchanged and applied to other illustrated and non-illustrated embodiments, and numerous variations, modifications, and additions further can be made thereto without departing from the spirit and scope of the present invention as set forth in the appended claims.

What is claimed is:

1. A dispenser assembly for dispensing a selected amount of sheet material, comprising:

a dispenser housing at least partially containing a supply of the sheet material and comprising a discharge chute formed along a portion of the dispenser housing for discharging the sheet material;

a feed roller assembly including a feed roller, the feed roller having a feed roller body, the feed roller body with an interior chamber and an outer wall, the outer wall with one or more openings defined through the outer wall, the feed roller rotatably mounted at least partially within the dispenser housing and configured to engage and direct the selected amount of the sheet material from the supply along a discharge path and through the discharge chute of the dispenser housing as the feed roller is rotated; and a cutting assembly including a cutting portion, a support positioned within the interior chamber of the feed roller body, and a pair of follower arms, each of the pair of follower arms located along a respective side portion of the feed roller body, the cutting portion configured to at least partially cut or perforate the sheet material, wherein the support is rotatably positioned within the interior chamber of the feed roller body, and each follower arm of the pair of follower arms includes a first end portion and a second end portion, the second end portion of each follower arm of the pair of follower arms being pivotably coupled to the feed roller body so as to be pivotable in relation to the feed roller body and rotatable with the feed roller body;

wherein the cutting portion is connected to a first end of the support and comprises a cutting edge;

wherein the cutting assembly is operatively connected to the feed roller so that the cutting portion is movable between an engaging position and a non-engaging position in coordination with rotation of the feed roller such that as the feed roller is rotated to dispense the sheet material, the cutting portion is moved from the non-engaging position at least partially positioned within the interior chamber of the feed roller body, along a radial path through the one or more openings defined in the outer wall of the feed roller body toward the engaging position, with the cutting portion extending at least partially out from the one or more openings, and into initial contact with the sheet material;

wherein the cutting portion rotates with the rotation of the feed roller such that the cutting portion moves with the sheet material and does not drag or scrape against the sheet material during cutting so as to prevent ripping, tearing, or bunching of the sheet material, and the cutting portion at least partially cuts or perforates the sheet material at an interval upon feeding or passage of a predetermined amount of the sheet material adjacent the cutting portion, and wherein the cutting edge of the cutting portion is moved at least partially into the one or more openings defined in the outer wall of the feed roller body when the cutting portion is in the non-engaging position;

wherein the second end portion of each follower arm projects through the respective side portion of the feed roller body along which each follower arm is located, and is connected to a second end of the support within the interior chamber of the feed roller body, such that rotation of the follower arms causes the support to be pivoted with respect to the feed roller body such that the first end of the support is moved radially within the interior chamber toward and away from the one or more openings to move the cutting portion between the engaging position and the non-engaging position; and wherein the support extends linearly from the second end of the support to the first end of the support, and wherein the cutting portion is oriented transversely to the first end of the support such that the cutting portion extends in a first direction relative to the first end of the support, and where each of the pair of follower arms extends from the second end of the support toward the first end of the support while curving in a second direction about a rotation axis of the feed roller, where the second direction is opposite the first direction.

2. The dispenser assembly of claim 1, wherein the cutting edge of the cutting portion has a series of teeth or serrated portions, the series of teeth or serrated portions extending so as to project at least partially through the one or more openings defined along the feed roller body.

3. The dispenser assembly of claim 1, wherein each of the follower arms includes a follower located at an end thereof, each follower of each follower arm being at least partially received within and movable along a respective track of a plurality of tracks defined along a portion of the dispenser housing, wherein as the feed roller is rotated to dispense the sheet material, the followers of the follower arms move along and at least partially engage the respective tracks and cause the follower arms to pivot in relation to the feed roller body so as to move the cutting portion toward the engaging position extending at least partially out of the one or more openings in the feed roller body of the feed roller to at least partially cut or perforate the sheet material.

4. The dispenser assembly of claim 1, further comprising at least one drive mechanism for driving rotation of the feed roller to dispense the sheet material.

5. The dispenser assembly of claim 1, wherein the dispenser is manually driven by actuation of a knob or lever in communication with the feed roller body to dispense the sheet material.

6. The dispenser assembly of claim 1, wherein the cutting portion is configured such that the cutting portion exerts a force of about IN to about 3 N on the sheet material during cutting or perforating of the sheet material.

7. A dispenser for dispensing sheet material, comprising:

a dispenser housing having a support for a supply of the sheet material, and the dispenser housing having a discharge chute for discharging the sheet material from the dispenser;

a feed roller assembly rotatably mounted at least partially within the dispenser housing, the feed roller assembly comprising a feed roller, the feed roller having a feed roller body, the feed roller body having an inner wall, a chamber defined in the feed roller body, and an outer wall including at least one opening defined through the outer wall, the feed roller being coupled to a drive mechanism for rotating the feed roller so as to dispense a selected amount of the sheet material through the discharge chute of the dispenser housing; and a cutting assembly integrated with the feed roller assembly, the cutting assembly comprising:

a cutting portion having a cutting edge, the cutting edge configured to at least partially cut or perforate the sheet material;

a base at least partially supporting the cutting portion, the base having a first end and an opposing second end, the cutting portion being connected to the first end of the base, and the base being rotatably mounted within the feed roller body with at least the second end of the base being positioned within the chamber of the feed roller body, the second end positioned along the inner wall of the feed roller body, and the second end being spaced apart from the at least one opening defined in the outer wall of the feed roller body; and a pair of follower arms, each of the pair of follower arms being located along a respective side portion of the feed roller body and having a first end portion and a second end portion, the first end portion of each follower arm pivotably coupled to the feed roller body and operatively connected to the second end of the base, each follower arm of the pair of follower arms having a follower, each of the followers is attached to a respective one of the second end portions of the follower arms and each follower received within a respective track of a plurality of tracks defined along the dispenser housing; and wherein as the feed roller is rotated to dispense the sheet material, the follower of each of the pair of follower arms being configured to move along the respective track of each of the pair of follower arms, causing rotation of each of the pair of follower arms such that the base rotates about the second end, causing the first end of the base and the cutting portion to be moved radially with respect to the rotation of the feed roller while the base and the cutting portion also rotate with the rotation of the feed roller to move the cutting portion at least partially into engagement with the sheet material for at least partially cutting or perforating the sheet material for dispensing thereof, wherein the cutting portion, including the cutting edge, is moved relative to the sheet material along a radial path through and at least partially out of the at least one opening defined in the outer wall of the feed roller body to initially contact at least a portion of the sheet material such that the cutting portion engages the sheet material in a stamped cutting or slicing action to at least partially cut or perforate the sheet material and does not drag against or scrape the sheet material to substantially prevent bunching, ripping, and/or inconsistent cutting or perforating thereof; and wherein the base extends linearly from the second end of the base to the first end of the base, and wherein the cutting portion is oriented transversely to the first end of the base such that the cutting portion extends in a first direction relative to the first end of the base, and where each of the pair of follower arms extends from the second end of the base toward the first end of the base while curving in a second direction about a rotation axis of the feed roller, where the second direction is opposite the first direction.

8. The dispenser of claim 7, wherein the cutting edge of the cutting portion includes a series of teeth or serrated portions.

9. The dispenser of claim 7, wherein the drive mechanism comprises a motor and a transmission assembly in communication with the feed roller body for transferring power between the motor and the feed roller body to drive rotation thereof.

10. The dispenser of claim 7, wherein the cutting portion is configured such that the cutting portion exerts a force of about IN to about 3 N on the sheet material during cutting or perforating of the sheet material.

11. A dispenser assembly, comprising:

a dispenser housing containing a supply of a sheet material and including a discharge chute for discharging the sheet material from the dispenser housing;

a feed roller being configured to feed and direct the sheet material from the supply along a discharge path and through the discharge chute of the dispenser housing as the feed roller is rotated, the feed roller including a feed roller body, the feed roller body including a substantially cylindrical outer wall, the outer wall configured to at least partially engage the sheet material as the feed roller is rotated, and the feed roller body further including an inner wall defining an interior chamber within the feed roller body, the outer wall having one or more openings defined therethrough; and a cutting assembly positioned within the interior chamber of the feed roller body, the cutting assembly including:

a cutting portion configured to at least partially cut or perforate a selected amount of the sheet material, wherein the cutting portion comprises a cutting edge;

at least one support being rotatably positioned within the interior chamber of the feed roller body and having an elongated support body having a first end portion and an opposing second end portion, the cutting portion fixedly connected to the first end portion of the support body and movable therewith, and wherein the second end portion of the support body is positioned along the inner wall of the feed roller body and is spaced apart from the one or more openings defined in the outer wall of the feed roller body; and a pair of follower arms, each of the pair of follower arms located along a respective side portion of the feed roller body and comprising an elongated follower arm body including a first end portion and a second end portion configured to be rotatably connected to the feed roller body, and each of the pair of follower arms comprising a follower connected to the respective first end portion;

wherein the respective second end portion of each elongated follower arm body is fixedly connected to a respective second end portion of the support body;

wherein the elongated follower arm body of each of the pair of follower arms is configured to engage and move along a respective track of a pair of tracks with rotation of the feed roller body;

wherein as the elongated follower arm body of each of the pair of follower arms move about the respective track of each of the pair of follower arms, each of the second end portions of each of the pair of follower arms rotates with respect to the feed roller body and causes the support body to pivot with respect to the feed roller body, and the first end portion of the support body to be moved radially within the interior chamber toward and away from the one or more openings such that the cutting portion is movable between a retracted position within the interior chamber of the feed roller body and an extended position projecting at least partially out from the one or more openings defined in the outer wall of the feed roller body sufficient to engage and cut or perforate the sheet material, the cutting portion being movable from the retracted position along a radial path and out of the one or more openings to the extended position while rotating with the rotating of the feed roller body, whereby the cutting portion initially contacts a portion of the sheet material engaged about the feed roller body and moves with the portion of the sheet material engaged about the feed roller body to create a stamped cutting or slicing action for at least partially cutting or perforating the sheet material without substantially dragging or scraping against the portion of the sheet material being engaged to substantially prevent or reduce bunching, ripping, tearing, and/or inconsistent dispensing of the sheet material, wherein the cutting edge of the cutting portion is moved at least partially into the one or more openings defined in the outer wall of the feed roller body when the cutting portion is in the retracted position; and wherein the support body extends linearly from the second end portion of the support body to the first end portion of the support body, and wherein the cutting portion is oriented transversely to the first end portion of the support body such that the cutting portion extends in a first direction relative to the first end portion of the support body, and where each of the pair of follower arms extends from the second end portion of the support body toward the first end portion of the support body while curving in a second direction about a rotation axis of the feed roller, where the second direction is opposite the first direction.

12. The dispenser assembly of claim 11, wherein the cutting portion is configured such that the cutting portion exerts a force of about IN to about 3 N on the sheet material during cutting or perforating of the sheet material.

13. The dispenser assembly of claim 11, wherein the respective track of each of the pair of follower arms includes a channel or groove defined in at least one sidewall of the dispenser housing, and wherein the channel or groove includes opposing facing sidewalls defining guide surfaces along which the elongated follower arm body of each of the pair of follower arms moves as the feed roller is rotated.

14. A dispenser assembly, comprising:

a dispenser housing containing a supply of a sheet material and including a discharge chute for discharging the sheet material from the dispenser housing;

a feed roller being configured to feed and direct the sheet material from the supply along a discharge path and through the discharge chute of the dispenser housing as the feed roller is rotated, the feed roller including a feed roller body, the feed roller body having a substantially cylindrical outer wall, the outer wall configured to at least partially engage the sheet material as the feed roller is rotated, and the feed roller body including an inner wall defining an interior chamber within the feed roller body, the outer wall having one or more openings defined therethrough; and a cutting assembly positioned within the interior chamber of the feed roller body, the assembly including:

a cutting portion having a cutting edge, the cutting edge configured to at least partially cut or perforate a selected amount of the sheet material;

at least one support being rotatably positioned within the interior chamber within the feed roller body and having an elongated support body having a first end portion and an opposing second end portion, with the cutting portion connected to the first end portion of the support body and movable therewith, and with the second end portion of the elongated support body being positioned within the interior chamber of the feed roller body and being spaced apart from the one or more openings defined in the outer wall of the feed roller body; and a pair of follower arms located along respective side portions of the feed roller body, each follower arm of the pair of follower arms comprising an elongated follower arm body including a first end portion and an opposing second end portion, the second end portion of each elongated follower arm body rotatably connected to the feed roller body, wherein a first one of the follower arms of the pair of follower arms includes a first follower rotatably connected to the first end portion of a first one of the follower arm bodies, and a second one of the follower arms of the pair of follower arms includes a second follower rotatably connected to the first end portion of a second one of the follower arm bodies;

wherein the second end portion of the support body is fixedly connected to the second end portion of the follower arm body of each follower arm, wherein the follower of each follower arm engages and moves along a respective track of a plurality of tracks with rotation of the feed roller body such that the cutting portion is movable between a retracted position within the interior chamber of the feed roller body and an extended position projecting at least partially out from the one or more openings defined in the outer wall of the feed roller body sufficient to engage and cut or perforate the sheet material, the cutting portion being movable from the retracted position along a radial path and out of the one or more openings to the extended position whereby the cutting portion initially contacts a portion of the sheet material engaged about the feed roller body so as to create a stamped cutting or slicing action without substantially dragging or scraping against the portion of the sheet material being engaged to substantially prevent or reduce bunching, ripping, tearing, and/or inconsistent dispensing of the sheet material;

wherein the second end portion of each follower arm further includes a mounting portion, each mounting portion including a first portion that pivotably or rotatably couples each of the follower arms to the feed roller body, and each mounting portion further including a second portion fixing each of the follower arms to the at least one support such that as the followers of the follower arms move along the respective track of the plurality of tracks, the second end portion of each follower arm pivots with respect to the feed roller body and causes the second end of the elongated support body to be pivoted with respect to the feed roller body such that the first end portion of the elongated support body is moved radially within the interior chamber toward and away from the one or more openings to move the cutting portion between the retracted position and the extended position; and wherein the support body extends linearly from the second end portion of the support body to the first end portion of the support body, and wherein the cutting portion is oriented transversely to the first end portion of the support body such that the cutting portion extends in a first direction relative to the first end portion of the support body, and where each of the pair of follower arms extends from the second end portion of the support body toward the first end portion of the support body while curving in a second direction about a rotation axis of the feed roller, where the second direction is opposite the first direction.

* * * * *